United States Patent [19]

Britton et al.

[11] 4,128,523

[45] Dec. 5, 1978

[54] POLYETHYLENE-EDPM COMPOSITIONS

[75] Inventors: James E. Britton, Akron; Fredric D. Metcalf, Rootstown; John G. Sommer, Hudson; Tiong H. Kuan; Victor R. Rilling, both of Akron; John A. Welch, Cuyahoga Falls, all of Ohio

[73] Assignee: The General Tire & Rubber Co., Akron, Ohio

[21] Appl. No.: 825,615

[22] Filed: Aug. 18, 1977

[51] Int. Cl.$^2$ .............................................. C08L 23/16
[52] U.S. Cl. ........................ 260/33.6 AQ; 260/897 A; 260/42.33; 260/42.46; 260/42.47; 260/33.6 R
[58] Field of Search .................... 260/897 A, 33.6 AQ

[56] References Cited

U.S. PATENT DOCUMENTS

| 3,806,558 | 4/1974 | Fischer | 260/897 |
| 3,919,358 | 11/1975 | Batiuk et al. | 260/897 |

FOREIGN PATENT DOCUMENTS

| 1043078 | 9/1966 | United Kingdom | 260/897 |

*Primary Examiner*—Carman J. Seccuro

[57] ABSTRACT

Blends of low molecular weight crystalline polyethylene and crystalline EPDM polymers exhibit good processing and on curing show unexpected high flexural modulus. The addition of reinforcing agents will raise the modulus and other physical properties but the processability can remain satisfactory.

28 Claims, 3 Drawing Figures

POLYETHYLENE-EDPM COMPOSITIONS

BACKGROUND OF THE INVENTION

Some automobile or vehicle parts such as fascia or sight shields are made from rubber compositions such as EPDM which use glass fibers to obtain high flexural modulus but are rendered deficient in that the surface after injection molding exhibits objectionable trail lines which require sanding before painting caused by the glass fibers which further produces mold and barrel wear to result in serious factory maintenance problems. Even after sanding and painting these trail lines may sometimes be seen.

DISCUSSION OF THE PRIOR ART

U.S. Pat. No. 3,361,850 discloses that the cold flow of EPDM polymers (crystallinity unknown) having a Mooney viscosity of 10 to 100 (ML-4/212° F.) and containing as high as 58% ethylene units can be improved by the addition of up to 5% of a branched polyethylene, PE, having a melt index of about 0.1 to 100, e.g., having a high to relatively high molecular weight. U.S. Pat. No. 3,468,979 states that a polymer composition having building tack and green strength can be obtained by blending two EPDM polymers, one having at least 55% propylene and the other having at least 55% ethylene. U.S. Pat. No. 3,468,979, further, states that the high propylene EPDM polymers are lacking in certain rubbery qualities such as tensile strength, hysteresis and ability to cure quickly while the high ethylene EPDM-polymers are very stiff, hard and almost impossible to tackify with resin or cements. U.S. Pat. No. 3,592,881 discloses a method for making cross-linked, heat-shrinkable films by blending high (70-85%) and low (30-15%) density PEs with 5 to 15 weight % of EPDM (viscosity and crystallinity not shown) and curing with sulfur monochloride. U.S. Pat. No. 3,806,558 states that a reprocessable thermoplastic can be prepared by masticating and shearing while partially curing a mixture of an essentially amorphous EPDM with a high molecular weight PE. U.S. Pat. No. 3,915,928 describes a Banbury mixable, injection moldable, curable composition allegedly useful for automotive exterior parts of 100 pbw of a crystalline EPDM (65-78% ethylene units), 75-150 pbw carbon black, and 5-30% of the composition of glass fibers. U.S. Pat. No. 3,915,928 states that part of the EPDM can be replaced by an amorphous EPDM and that an extending oil may be used, but it does not disclose PE and does not disclose the omission of the carbon black and glass fibers. U.S. Pat. No. 3,941,859 discloses a thermoplastic blend which does not need curing agents of 100 parts EPDM (having unstretched crystallinity and from 65-85% ethylene units), 5-400 parts PE (low melt index or high molecular weight) and 5-300 parts ethylene-vinyl acetate copolymer; it, however, does not disclose that the ethylene-vinyl acetate copolymer can be omitted.

U.S. Pat. No. 3,957,919 describes a process for making a thermoplastic composition by simultaneously subjecting to hot working and to a free radical reaction (in the presence of a free radical catalyst usually a peroxide) a mixture of EPDM, PE and polypropylene (PP) in an amount of 4-15% PE and 85-94% EPDM + PP in the ratio 10-90 EPDM and 90-10 PP. The PE can be high to low density. The polypropylene is crystalline. It states that improvements in physical properties (flexure, tensile strength and elongation) are obtained when the ratio of ethylene to propylene in the EPDM is above 70:30 or 75:25 which corresponds to a range where the crystallinity increases perceptively. It discloses the use of clay, oil and calcium carbonate. In column 8 it shows that the EPDMs had Mooney viscosities (1+8) of 34 to 74. In comparative Example 42 it shows a mixture of Epsyn 70A EPDM (having a Mooney of 68 and an ethylene content of 67%), a high density polyethylene and Varox (a peroxide). The patent does not disclose the molecular weight or melt index of the PE.

U.S. Pat. No. 4,005,054 discloses a mixture of a rubber which among others may be EPDM containing at least about 5% by weight of a crystalline polyolefin having a molecular weight of at least 500,000 in the form of fibrils. The polyolefin can be polyethylene or polypropylene. The molecular weight and crystallinity of the EPDM are not disclosed.

British Pat. No. 1,043,078 (1966) states that wire and cable coatings can be made from a blend of 10 to 1,000 parts of a polyolefin per 100 parts of EPDM polymer containing not more than 75% ethylene. The only working example shows an EPDM having an ethylene content of 67.5%. The patent does not disclose the crystallinity and molecular weight of the EPDM. The molecular weight and crystallinity of the PE to be used are not suggested although in Example III Run 7, the PE had a melt index of 7.8 which means that it had a relatively high molecular weight.

Canadian Pat. No. 798,416 (1968) shows a blend suitable for making films for heavy duty bags containing 10 to 60% of the blend of EPDM polymer having an ethylene content of 25-75, preferably 40-65, mole % and a Mooney viscosity of 30 to 100, preferably 50 to 85. The remainder of the blend may be crystalline PE. The molecular weight of the PE is not shown although the PE must have had a high molecular weight because in Table 1 with only 10% EPDM the tensile strength (MD) was 4250 p.s.i. whereas with 50% EPDM it had dropped to 3230 p.s.i. It is not shown that the EPDM is crystalline.

OBJECTS

Accordingly, it is a primary object of the present invention to overcome the difficulties alluded to above and to provide an EPDM composition which is readily processable and on curing exhibits a high flexural modulus without the necessity of using any or any appreciable amount of glass fibers and which does not show any trail lines.

Another object of this invention is to provide a cured EPDM composite exhibiting high flexural modulus and other desirable physical properties.

These and other objects and advantages of the present invention will become more apparent to those skilled in the art from the following detailed description, working examples and drawings wherein.

SUMMARY OF THE INVENTION

Figure 1:
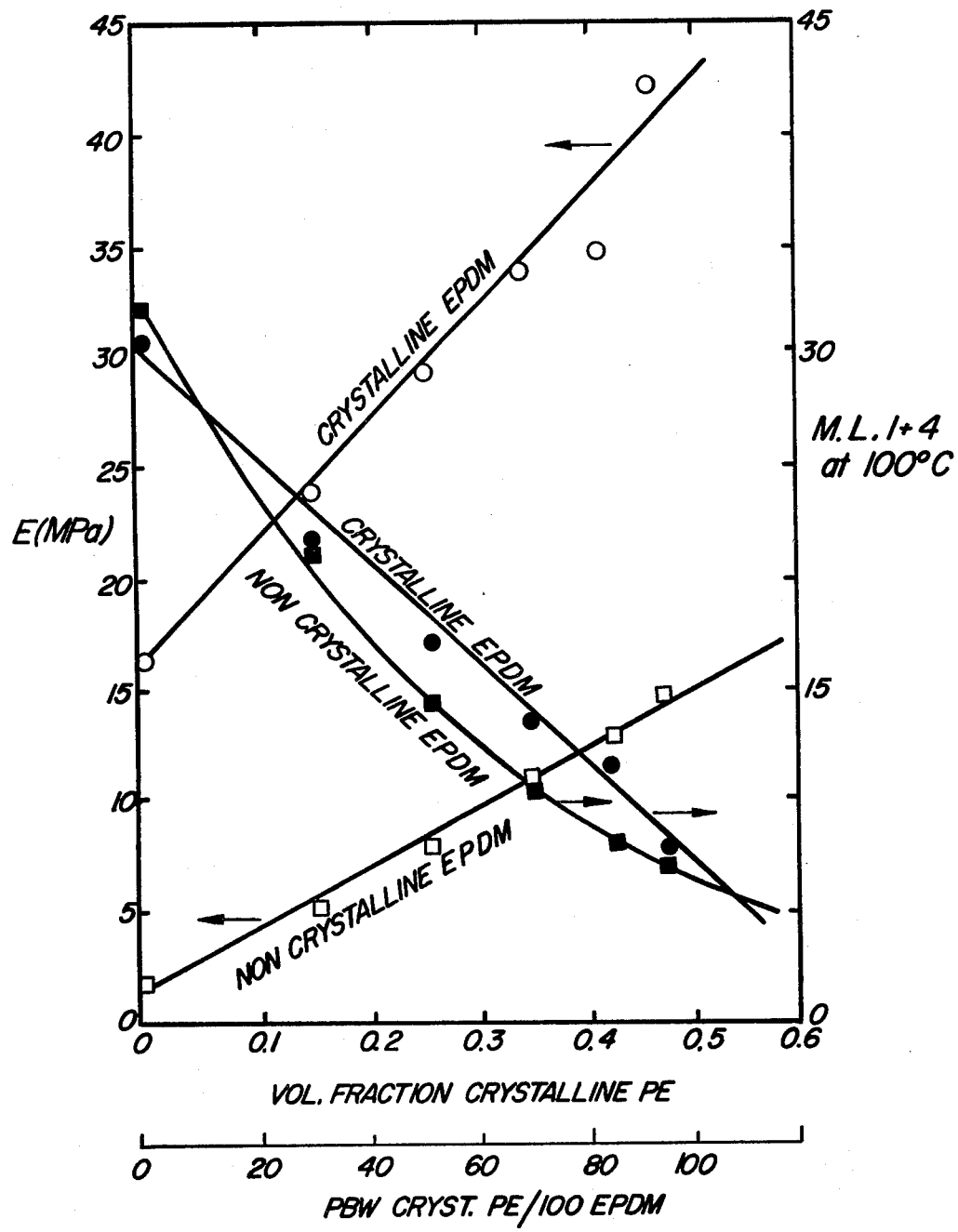
FIG. 1 is a graph showing the differences in Mooney viscosities and Young's Moduli for unfilled crystalline EPDM-crystalline polyethylene compositions as compared to non-crystalline EPDM-crystalline polyethylene compositions.

It has been found that the addition of low molecular weight crystalline polyethylene to crystalline EPDM rubber will provide processable compositions of high Young's Modulus. In fact it was surprising to find that while increasing amounts of the crystalline polyethylene progressively reduced the Mooney viscosity of the EPDM, it unexpectedly progressively increased the Young's Modulus of the blend. This trend, also, was observed with respect to non-crystalline EPDM rubber. However, the use of the crystalline EPDM provides an overall Young's Modulus of over 50 to 100% higher than that shown for a blend using the non-crystalline EPDM. Carbon black and clay reinforced products of the present invention show physical properties equivalent to glass filled EPDM products but do not show trail lines which need to be sanded, an expensive step. Moreover, the products of the present invention are generally isotropic rather than being anisotropic which is generally a characteristic of the glass filled EPDM products. Isotropic products provide more uniform shrinkage on cooling after hot molding, thus reducing distortion.

DISCUSSION OF DETAILS AND PREFERRED EMBODIMENTS

The curable or vulcanizable EPDM polymers (ethylene-propylene-diene monomer rubbery or elastomeric co or terpolymers) should have an uncompounded or raw Mooney viscosity ML (1+4) at 250° F. of from about 25 to 100, preferably from about 25 to 35, a crystallinity at room temperature without stretch of from about 1.5% to about 16%, preferably from about 4.5 to 13%, and an ethylene content of at least about 65 mole %, preferably at least about 75 mole %, the balance of the terpolymer being derived from propylene and a minor amount (not over about 10%, usually not over about 5%) of a diene preferably a non-conjugated diene. The non-conjugated diene can be any one or more of those generally known to the art but preferably is 1,4-hexadiene, ethylidene norbornene or dicyclopentadiene. Very minor amounts of other copolymerized monomers such as hexene, butene and so forth may be present as long as they do not adversely affect the properties of the EPDM, and the diene comonomer can comprise a mixture of dienes as is well known to those skilled in the art. Blends of EPDM terpolymers can be used. The EPDM terpolymer blends can include EPDM rubbery terpolymers which have high or low Mooney viscosities, which are crystalline or amorphous, and which have high or low crystalline contents so long as the blend of the EPDM rubbery terpolymers falls within the definition set forth above. Rubbery or elastomeric EPDM terpolymers, methods for making them and methods for curing them are known as shown by "Rubber Chemistry And Technology," Volume 45, No. 1, March, 1972, Division of Rubber Chemistry, Inc., American Chemical Society, pages 709 to 881; "Rubber Technology," 2nd Ed., Morton, Van Nostrand Reinhold Company, New York, 1973, Chapter 9; "Polymer Chemistry of Synthetic Elastomers," Part II, High Polymer Series, Vol. 23, John Wiley & Sons Inc., New York, 1969, Chapter 7; "Encyclopedia Of Polymer Science and Technology," Interscience Publishers a division of John Wiley & Sons, Inc., New York, Vol. 6 (1967) pages 367-8 and Vol. 5 (1966) page 414; "Encyclopedia Of Chemical Technology," Kirk-Othmer, Interscience Publishers Div. of John Wiley & Sons, Inc., New York, 2nd Ed. (1965) Vol. 17, pages 575–576 and 2nd Ed. (1965) Vol. 7, pages 686 to 693; "The Elastomers Manual," International Institute of Synthetic Rubber Producers, Inc., New York, 1974 Edition; and "Types Of Nordel Hydrocarbon Rubber," Bedwell, pamphlet NOR-101, 1974, E. I. du Pont de Nemours and Company, Wilmington, Delaware.

The polyethylene, PE, used should be a solid, crystalline and have an average molecular weight of from about 6,000 to 15,000. The polyethylene can be a low, medium or high density polyethylene, but preferably it is a low density polyethylene. Polyethylenes and methods for making them are shown by "Polyolefins: Structure and Properties," Boenig, Elsevier Publishing Company, New York, 1966; "Crystalline Olefin Polymers," Part I, High Polymers, Vol. XX, Raff and Doak, Interscience Publishers, John Wiley & Sons, Inc., New York, 1965; "Rubber Technology," 2nd Ed., Morton, Van Nostrand Reinhold Company, New York, 1973, pages 559 to 570; "Crystalline Olefin Polymers," Part II, High Polymers, Vol. XX, Raff and Doak, Interscience Publishers, John Wiley & Sons, Inc., New York, 1964; "Encyclopedia Of Chemical Technology," Kirk-Othmer, Vol. 14, 2nd Ed., 1967, Interscience Publishers Div. of John Wiley & Sons, Inc., New York, pages 219 to 221, 238, 242, 259 to 265 and 275; and "Polyethylene," Raff and Allison, Interscience Publishers Inc., New York, 1956, page 234.

The crystalline polyethylene is used in the blend in an amount of from about 5 to 110 parts by weight, preferably from about 10 to 40 parts by weight, per 100 parts by weight of the crystalline EPDM.

To obtain the best physical properties of the blend of this invention it is compounded with rubber reinforcing fillers or pigments, processing oils and cured using a sulfur curing system.

The finely divided pigments and/or fillers including reinforcing pigments and/or fillers, for example carbon blacks and non-carbon blacks, employed are the ones generally used in compounding rubber in the rubber industry. Thus, there can be used the reinforcing, semi-reinforcing, easy processing, extrusion and high abrasion carbon blacks as well as other blacks. While channel, furnace, acetylene and thermal blacks can be used, it is preferred to employ the furnace blacks, especially the semi-reinforcing and/or fine extrusion blacks. If the final part is to be painted, non-staining blacks should be used. Carbon black and its properties are well known as shown by the "Encyclopedia of Chemical Technology," Kirk-Othmer, Vol. 4, 2nd Ed., 1964, pages 243–282, Interscience Publishers, a Div. of John Wiley & Sons, Inc., New York. There, also, can be used the hard and soft clays, the silicas and silicates and the calcium carbonates and other non-black type rubber rinforcing pigments/fillers. Examples of these materials are calcium carbonate, calcium sulfate, silica, aluminum silicate, mica, feldspar, aluminum hydroxide, magnesium silicate, barium sulfate, asbestos, Perlite, calcium magnesium silicate, magnesium carbonate, glass microbeads silane treated or untreated, titanium dioxide, and the like. Mixtures of these fillers can be used. The fillers are used in an amount sufficient to obtain the desired viscosity and reinforcement of the crystalline EPDM-crystalline PE composition of the present invention. For example, they may be used in an amount of from about 75 to 250, preferably from about 125 to 215, parts by weight per 100 parts by weight of the crystalline EPDM rubber. Where problems may be encountered regarding paint adhesion due to galvanic action, not over about 30% by weight of the total composition should be carbon black, the balance of the filler needed being satisfied by sufficient amounts of one or more of the above non-black fillers or pigments.

Processing oils may be added to the composition of the present invention to aid in mixing and calendering, to reduce viscosity, and to improve extruding and molding. They, also, may be used in part as an extender for the higher Mooney rubbers. Preferred are the naphthenic and paraffinic oils although the aromatic oils may be used if desired. Non-staining oils, also, are preferred. The incorporation and use of processing or extending oils in rubber is well known to the art. See "Plasticizer Technology", Vol. 1, Bruins, 1965, Reinhold Publishing Corp., New York; "India Rubber World," Vol. 126, No. 4, July, 1952, pages 495–499; and "Industrial And Engineering Chemistry", May, 1953, pages 1035–1053. The oils may be used in an amount sufficient to obtain the desired degree of processing or extension of the composition or rubber, usually not over about 75 parts by weight of oil per 100 parts of the crystalline EPDM rubber. Preferably, there are used from about 5 to 35 parts by weight of the processing oil per 100 parts by weight of the crystalline EPDM rubber. It, also, will be appreciated that the levels of curatives, oil and/or filler may have to be adjusted to get the desired viscosity of the composition to permit proper processing in the Banbury and on mills or calenders. Moreover, adjustment of curatives filler and/or oil level may be necessary to get a viscosity low enough at suitable injection pressures and/or temperatures to provide good material flow and relatively short injection times where injection molding machines are to be used.

Sulfur type curing or vulcanizing systems are best used with the compositions of the present invention, particularly those which are loaded with filler to get high flexural modulus. The type and level of curatives for the sulfur cure system are used in an amount or level necessary to get the desired properties and state of cure with a long enough scorch life to preclude any tendency of the composition to set up in the barrel or manifold of an injection molding machine when molding by injection molding. Also, scorch life should be sufficient to permit processing and compression molding. Sulfur type curatives are disclosed in the references mentioned supra. For example for sulfur curing, there can be used sulfur or sulfur furnishing compounds, zinc oxide, zinc stearate, stearic acid, tetramethylthiuram disulfide, 2-mercaptobenzothiazole, dithiocarbamate-thiazole blends, tellurium diethyldithiocarbamate, dipentamethylene thiuram hexasulfide, zinc dimethyldithiocarbamate, zinc salt of 2-mercaptobenzothiazole, tetramethylthiuram monosulfide, tetraethylthiuram disulfide, dipentamethylenethiuram tetrasulfide, benzothiazyl disulfide, zinc diethyldithiocarbamate, zinc dibutyldithiocarbamate, 4,4'-dithiodimorpholine, N-cyclohexyl-2-benzothiazole sulfenamide and the like and mixtures of the same. When non-black stocks are used, color pigments may be used such as phthalocyanine blue, phthalocyanine green and other non-deteriorating color pigments. Antidegradants may also be added such as U-V absorbers, chelators, flame retardants and other antidegradants. Rubber retarders may be used to reduce any scorch. Retarders are described in "Materials, Compounding Ingredients, and Machinery For Rubber," Bill Communications, Inc., New York, 1977, pages 64 to 66. An example of a retarder is N-(cyclohexylthio)-phthalimide.

The compositions of the present invention may be mixed in a Banbury, on a rubber mill or in other suitable rubber mixing apparatus. The compositions may be extruded, compression or transfer molded or injection molded and cured using apparatus or equipment, and times and temperatures well known to those skilled in the art. Preferably, all of the ingredients except the sulfur and the accelerators are mixed in a Banbury; then there are added the sulfur and accelerators to the composition on a 2-roll rubber mill to reduce scorching or the initiation of vulcanization. Or, a one or two stage Banbury mixing cycle can be used.

The crystalline EPDM-crystalline PE compositions of this invention can be used in the manufacture of insulation and jacketing for electrical wire and cable and for molded electrical connectors, toys, swim fins, floor mats, conveyor belts, electrical tape, automotive heater hose, molded gasketing, automotive body mounts, end caps, radiator hose, automobile white sidewalls, garden hose, and caulking compounds. In particular, certain formulations of these compositions can be used for automobile fascia and sight shields. Automobile fascia mechanical cured requirements generally specify a flexural modulus of about at least 20,000 p.s.i. at room temperature, a maximum heat sag in the range of about 0.80 in. at 250° F., a flexural set of a maximum of 20°, a minimum tear in pounds per linear inch (Die C) of 200, a 100% modulus of 800 to 2,000 p.s.i., a minimum tensile strength of 1,500 p.s.i., and an elongation of at least 150%. Sight shields, however, do not have to be as stiff and may have a flexural modulus of only 5,000 to 10,000 p.s.i. at room temperature, a 100% modulus of at least 900 p.s.i., a tensile strength of at least 2,000 p.s.i. and a minimum elongation of 200%. The compositions of this invention can readily be painted by methods known to the art. Usually prior to painting the surface of the cured composition to make it adhere better to the paint, it can be treated by etching or by other means and then spray painted and, if sufficiently conductive, can be electrostatically spray painted.

The following examples will serve to illustrate the present invention with more particularity to those skilled in the art. In these examples parts are parts by weight, and the materials used are the same unless otherwise shown.

EXAMPLE 1

Crystalline polyethylene (Epolene C-10) was blended or mixed in various amounts in a Banbury with crystalline EPDM (Nordel 2722) or non-crystalline EPDM (Nordel 2522) and part of the curatives. Sulfur and accelerators were then added on a mill. Portions of the curable compounded blends were then tested as to their Mooney viscosities (ML1+4 at 100° C.). Other portions were cured by compression molding at 350° F. for 10 minutes and then tested as to their Young's Moduli, E, and reported in mega Pascals. The compounding recipe used and the results obtained are shown below:

Table 1

| Material | COMPOSITION Parts By Weight |
|---|---|
| EPDM (Nordel 2722 or 2522) | 100 |
| Cryst. Polyethylene (Epolene C-10) | Variable |
| NOBS Special | 1.75 |
| Vocol S | 2.82 |
| Sulfur | 2.50 |

Table 1-continued

| Material | COMPOSITION Parts By Weight |
|---|---|
| Zinc Oxide | 5 |
| Zinc Stearate | 1 |

Table 1A

| Ratio Parts By Weight Cryst. Poly-ethylene per 100 parts EPDM, approx. | Young's Modulus E(MPa), Approx. | | Compound Mooney Viscosity, Approx. | |
|---|---|---|---|---|
| | Cryst. EPDM | Non Cryst. EPDM | Cryst. EPDM | Non Cryst. EPDM |
| 0 | 17 | 2 | 30 | 32 |
| 20 | 24 | 5 | 22 | 21 |
| 39 | 29 | 8 | 17 | 14 |
| 58 | 34 | 11 | 14 | 10 |
| 77 | 35 | 13 | 11 | 8 |
| 97 | 43 | 15 | 8 | 7 |

As shown graphically in FIG. 1 of the attached drawings the use of crystalline polyethylene does reduce the Mooney viscosity of the uncured curable polymer blends so that they are generally processable. However, for the same levels of crystalline polyethylene the Young's Modulus (stiffness) for the cured crystalline EPDM containing blend increased from 17 to 43 MPa as compared to an increase of 2 to 15 MPa for the non-crystalline EPDM containing blend, a range of 26 MPa versus a range of 13 MPa (mega Pascals) indicating a very substantial difference.

In other words increasing levels of PE in both the crystalline and non-crystalline EPDM blends cause decreasing viscosity, with the viscosity of the blend being relatively independent of the type of EPDM. Young's modulus (E), in contrast, is markedly dependent on both the PE level in the EPDM/PE blend and on the type of EPDM. The Young's modulus of the crystalline EPDM is significantly higher than that of the amorphous EPDM at zero PE content, and the modulus increases much more rapidly with increasing PE content for the crystalline EPDM. Based on these results, it is believed that the combination of the crystalline EPDM and the crystalline PE causes a synergistic increase in stiffness, while maintaining low viscosities. There is an apparent interaction between the crystalline phases in the PE and in the EPDM.

NOTES:

"Epolene" C-10: Crystalline polyethylene; approx. molecular weight of 8,000; density at 25° C. of 0.906; acid number <0.05; Brookfield viscosity spindle #3, 6 rpm, 9400 c.p.; melt index 190° C. of 2250; ring and ball softening point of 140° C.; Eastman Kodak Company; DTA, Differential Thermal Analysis, using a heating rate of 20° C./min. from liquid temperature up to 170° C. showed crystallinity.

"Nordel" 2722: Ethylene-propylene-diene random terpolymer rubber or elastomer; from about 2 to 11% crystallinity at room temperature without stretch; third monomer is 1,4-hexadiene; specific gravity of 0.85; reported Mooney viscosity ML (1+4) at 250° F. of 25; about 87 mole % ethylene based on $C^{13}$ NMR; fast cure; E. I. du Pont de Nemours and Company; DSC showed crystallinity.

"Nordel" 2522: Ethylene-propylene-diene random terpolymer rubber or elastomer; an amorphous polymer; third monomer is 1,4-hexadiene; specific gravity of 0.85; reported Mooney viscosity ML (1+4) at 250° F. of 25; fast cure; E. I. du Pont de Nemours Company; DSC showed no crystallinity.

"NOBS" special: N-Oxydiethylene benzothiazole 2-sulfenamide; American Cyanamid Co.

"Vocol" S: 62% zinc-O,O-dibutylphosphorodithioate, 38% inorganic silicous carrier; Monsanto Co.

Mooney viscosity: ASTM Special Technical Bulletin No. 184, 1956, "Glossary Of Terms Relating To Rubber And Rubber-Like Materials," page 67. All experimental Mooneys reported herein are Mooney Large rotor or converted to Mooney Large rotor from Mooney Small rotor. See, also, ASTM D-1646.

Young's Modulus: "Wittington's Dictionary of Plastics," First Ed., 1968, Technomic Publ. Co., Inc., Stanford, Conn., page 156. Young's Modulus is a better definition of the stiffness of a material and is characteristic of a given material. On the other hand Flexural Modulus takes into consideration the geometry of a specimen and is better understood from an engineering standpoint. In Table 1A, above, Young's Modulus E(MPa) of 24 = E (p.s.i.) of 3481.

EXAMPLE 2

The method of this example was the same as that of Example 1, above, except that other essentially non-crystalline higher Mooney EPDMs, fillers and/or reinforcing agents, processing oil, etc. were added to the compositions. Portions of the compounded curable compositions were tested uncured as to their Mooney viscosity (ML1+4 at 100° C.) while other portions were tested after cure as to their Young's moduli. The compounding recipe used and the results obtained are shown below:

TABLE 2

| | COMPOSITION | |
|---|---|---|
| | Parts By Weight | |
| Material | Run 2-I | Run 2-II |
| EPDM (Nordel 2722) | 80 | — |
| EPDM (Nordel 2522) | — | 80 |
| EPDM (Nordel 1635) | 10 | 10 |
| EPDM (Nordel 1660) | 10 | 10 |
| Cryst. Polyethylene (Epolene C-10) | Variable | Variable |
| NOBS Special | 1.75 | 1.75 |
| Vocol S | 2.82 | 2.82 |
| Sulfur | 2.5 | 2.5 |
| Zinc Oxide | 5.00 | 5.00 |
| Zinc Stearate | 1.00 | 1.00 |
| Sunpar 2280 | 10.00 | 10.00 |
| Suprex Clay | 76.00 | 76.00 |
| SRF-NS Black | Equal amounts of each carbon black; total of both blacks equal to 18% constant by volume of total volume of each composition | |
| FEF Black | | |

TABLE 2A

| | RESULTS | | | |
|---|---|---|---|---|
| Ratio Parts By Weight Cryst. Poly-ethylene per 100 Parts Total EPDM, Approx. | Young's Modulus E(MPa), Approx. | | Compound Mooney Viscosity, Approx. | |
| | (2-I) Cryst. EPDM | (2-II) Non Cryst. EPDM | (2-I) Cryst. EPDM | (2-II) Non Cryst. EPDM |
| 25 | 170 | 70 | 65 | 59 |
| 50 | 160 | 95 | 44 | 40 |
| 75 | 170 | 90 | 31 | 31 |
| 100 | 185 | 117 | 25 | 25 |

Figure 2:
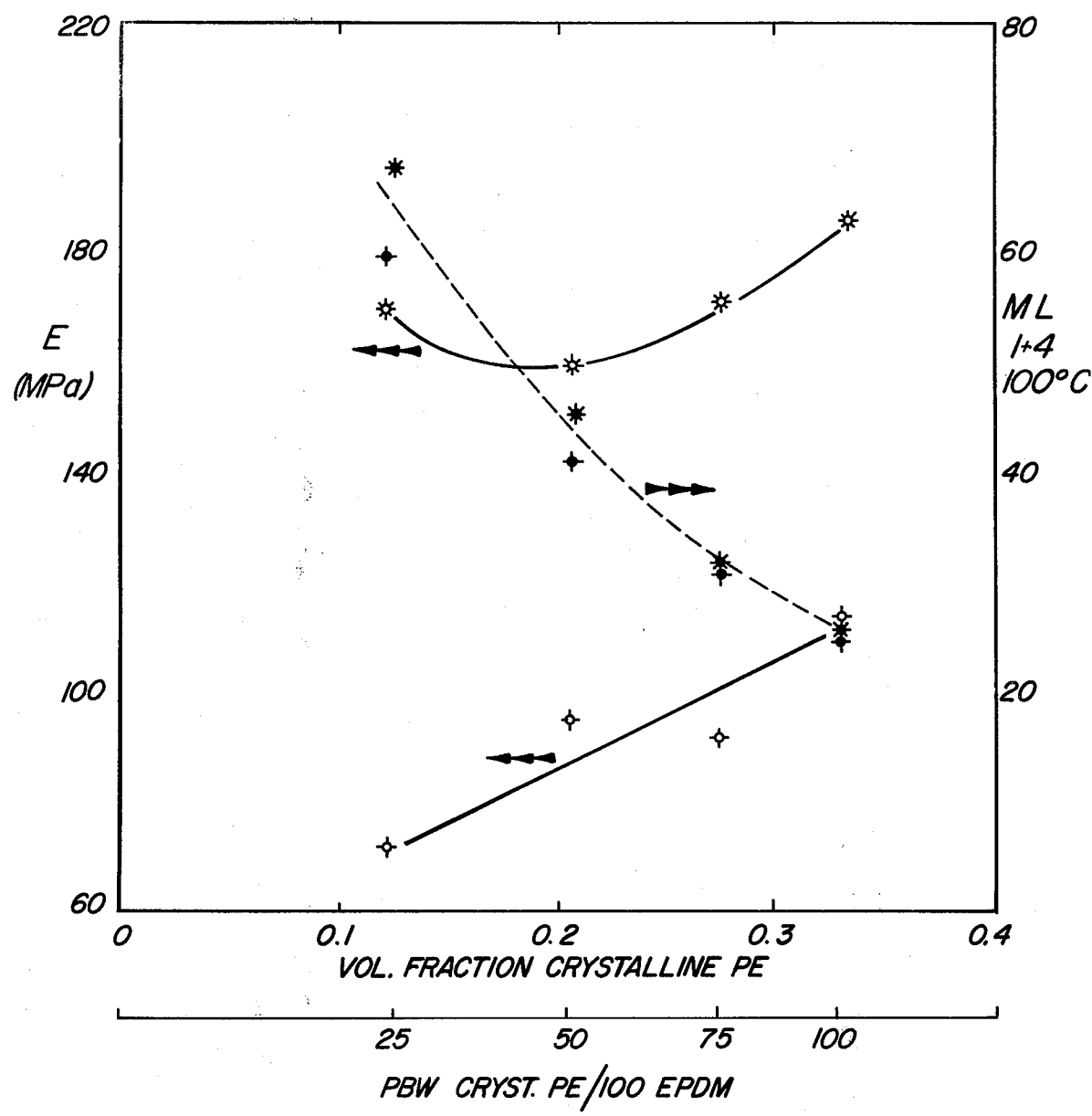
FIG. 2 is a graph showing the difference in Mooney viscosities and Young's Moduli for filled or reinforced crystalline EPDM-crystalline polyethylene compositions versus essentially non-crystalline EPDM-crystalline polyethylene compositions.

As shown in FIG. 2 of the attached drawings the use of crystalline polyethylene reduces the Mooney viscosity of both compounded curable and filled EPDM compositions. However, on curing the composition containing the crystalline EPDM exhibited a Young's Modulus of 160 to 185 as compared to a Young's Modulus of 70 to 117 for the composition containing the non-crystalline or essentially non-crystalline EPDM. The Young's Modulus curves do not overlap and on the average the Young's Modulus for the cured crystalline EPDM containing filled blend is 78 points or 84% higher than the cured essentially non-crystalline EPDM containing filled blend.

Figure 3:
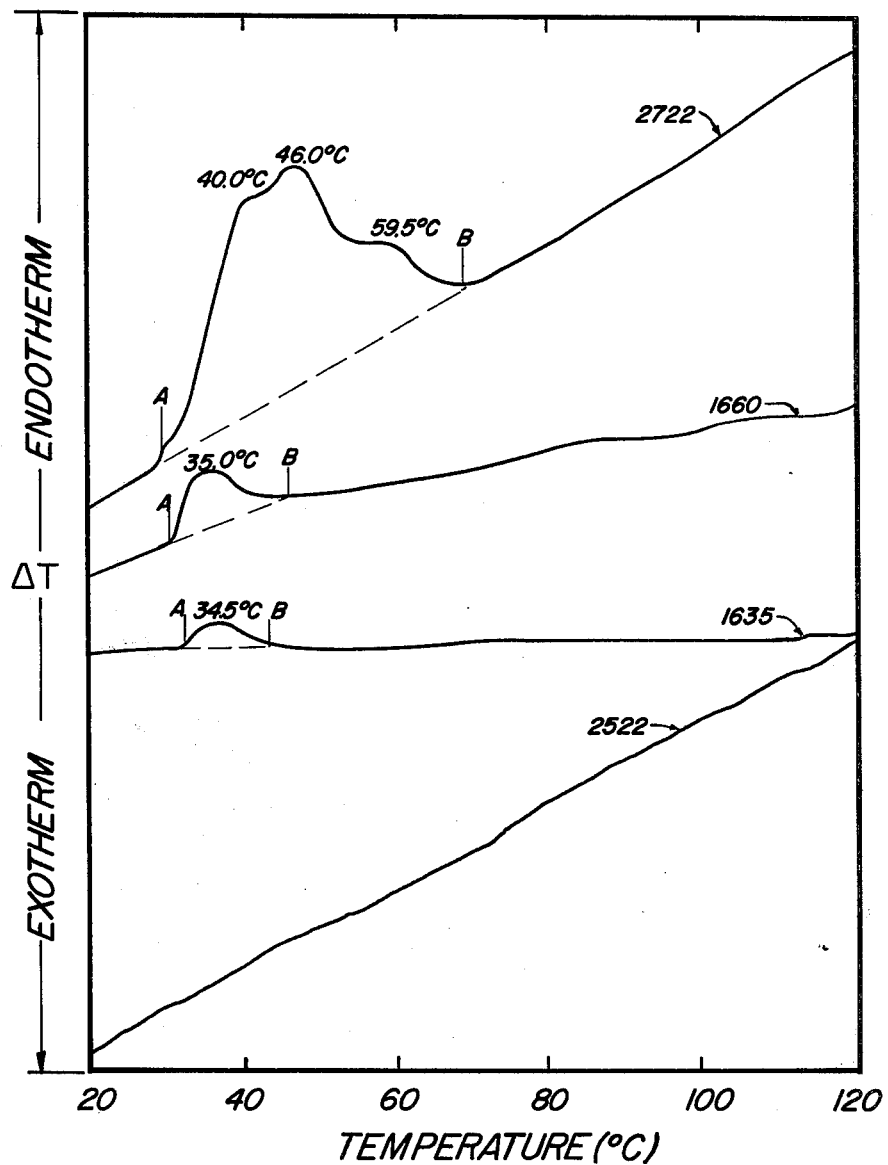
FIG. 3 is a graph showing the Differential Scanning Calorimetry Spectra of different EPDM polymers.

The presence of a melting endotherm above room temperature can be used to determine the crystalline nature of an EPDM polymer. A Perkin Elmer Differential Scanning Calorimeter was used. Differential Scanning Calorimetry spectra of the above Nordel 2722, 1635, 1660 and 2522 EPDM polymers are shown in the attached FIG. 3. Nordel 2722 has the highest degree of crystallinity as shown by the large melting endotherm (the enclosed area defined by the solid and dashed lines between the points A and B on the curve). Nordels 1660 and 1635, also, are slightly crystalline, but their degree of crystallinity is seen to be very much smaller than Nordel 2722. Nordel 2522, on the other hand, does not exhibit any endotherm and hence can be classified as non-crystalline.

To calculate the degree of crystallinity, the area under the endotherm is measured using a planimeter (see Perkin Elmer's DSC 1B Instruction Manual, November, 1966). This area, when multiplied by a constant supplied by the instrument manufacturer (see said Manual), will give the heat of fusion of the EPDM polymer in units of calories/gram.

The heat fusion of the EPDM polymer is then compared with that of a theoretical 100% crystalline material (polyethylene). Polyethylene is used as the reference since it is assumed that the crystallinity of the EPDM is derived mainly from the ethylene sequences. Thus:

$$\%\text{crystallinity} = \frac{\text{Heat of fusion of EPDM sample}}{\text{Heat of fusion of 100\% crystalline PE}} \times 100$$

The heat of fusion of a theoretical 100% crystalline polyethylene is available from the literature. Wunderlich and Cormier, Journal of Poly. Science, A-2, 5, 987, 1967, reported a value of 68.4 cals./gram.

The heat of fusion of Nordel 2722 EPDM polymer samples, measured at different times using samples taken from different lots, ranged from about 1.4 to 7.2 cals./gram. In terms of degree of crystallinity, these correspond to from about 2 to 11% crystallinity.

Nordels 1660 and 1635 EPDM polymers have less than 1% crystallinity or less than 1 cal/gram of fusion energy and can be considered as relatively or essentially non-crystalline.

NOTES

"Nordel" 1635: Ethylene-propylene-diene random terpolymer rubber or elastomer; third monomer is 1,4-hexadiene; specific gravity of 0.85; Mooney viscosity ML (1+4) at 250° F. of 35; about 71 mole % ethylene; fast cure; E. I. du Pont de Nemours and Company.

"Nordel" 1660: Ethylene-propylene-diene random terpolymer rubber or elastomer; third monomer is 1,4-hexadiene; specific gravity of 0.85; Mooney viscoisty ML (1+4) at 250° F. of 60; about 71.4 mole % of ethylene; faster than normal cure; E. I. du Pont de Nemours and Company.

"Sunpar" 2280: Paraffinic type oil, ASTM D2226 Type 104 B; viscosity SUS at 100° F. = 2907; density 20/4 of 0.8879; molecular weight of 720; 4% aromatic carbon atoms, 23% naphthenic carbon atoms, and 73% paraffinic carbon atoms; Sun Oil Company.

"Suprex" Clay: Finely divided hydrated aluminum silicate (South Carolina hard clay); J. M. Huber Corp.

SRF-NS: Finely divided carbon black; semi-reinforcing furnace, non-staining.

FEF: Finely divided carbon black; fast extrusion furnace.

EXAMPLE 3

The following compositions were blended or mixed in a Banbury, cured and then tested.

TABLE 3

| Material | Parts By Weight And Results | | | |
|---|---|---|---|---|
| | Run 3-I | Run 3-II | Run 3-III | Run 3-IV |
| NOrdel 2722 (Cryst. EPDM) | — | 70 | 80 | Commercial |
| Nordel 1660 EPDM | 50 | 15 | 10 | Curable |
| Nordel 1635 EPDM | 50 | 15 | 10 | Glass Fiber |
| FEF Black | 64.5 | 47.5 | 47.5 | Filled |
| SRF-NS Black | 64.5 | 47.5 | 47.5 | EPDM |
| Sunpar 2280 | 20 | 10 | 10 | Composition |
| Suprex Clay | 76 | 76 | 76 | — |
| DNPA 3130 | 30 | — | — | — |
| Epolene C-10 (Cryst. PE) | — | 25 | 25 | — |
| Epolene C-15 (PE) | 60 | — | — | — |
| NOBS Special | 1.75 | 1.75 | 1.75 | — |
| Vocol S | 2.82 | 2.82 | 2.82 | — |
| Sulfur | 2.50 | 2.50 | 2.50 | — |
| Zinc Oxide | 5.00 | 5.00 | 5.00 | — |
| Zinc Stearate | 1.00 | 1.00 | 1.00 | — |
| 100% Modulus, P.S.I.** | 1040 | 1380 | 1370 | 1130/850* |
| Ultimate Tensile Strength, P.S.I.** | 1710 | 1760 | 1720 | 1960/1420 |
| Ultimate Elongation, %** | 330 | 210 | 210 | 270/210 |
| Tear, Die C, lbs./in.*** | 245 | 230 | 240 | 270/220 |
| Hardness, Shore A | — | 95 | 96 | — |
| Compound Mooney Viscosity, ML 1+4 at 100° C. | 83. | 86.1 | 82.5 | 53.0 |
| Mooney Scorch at 275° F. (Min. to 5 pt. rise) | 22. | 15.5 | 15.6 | 30.0 |
| Flexoral Modulus, RT, psi (MPa)**** | 16,900 | 20,000 (137.9) | 20,200 (139.3) | 26,700/11,500 |
| Heat Sag, in., at 250° F.# | 1.30 | .56 | .68 | 0.31/0.73 |
| Galvanic Response | Passed | Passed | Passed | Passed |
| Cold Temperature Impact, −10° F. | Passed | Passed | Passed | Passed |
| Flexural Set, Degrees## | 12. | 13.3 | 13.7 | 16.0/8.7 |
| Water Immersion### | Passed | Passed | Passed | Passed |
| Humidity#### | — | Passed | Passed | Passed |
| Specific Gravity | — | 1.231 | 1.231 | 1.167 |

*Mill direction/cross mill direction
**ASDTM D-412
***ASTM D-624
****ASTM D-790 using a more simple fixture
Chevrolet Eng. Center Spec. CTZ-ZZ006-AA with results normalized for thickness.
Chev. Eng. Center Spec. CTZ-ZZ003-AA.
Ford test procedure BI 4-1.
Chrysler Spec. LP-463PB-9-01.

The above data shows that compositions 3-II and 3-III, containing crystalline EPDM provide the desired flexural modulus and other properties and are comparable to a curable glass fiber filled EPDM, composition 3-IV, a commercially available material. Composition 3-I which contained essentially non-crystalline EPDM as well as a high loading of reinforcing filler, Epolene C-15, and "DNPA" 3130 (Branched polyethylene, low density, melt index = 1 g/10 min., MP = 230° F., Union Carbide) gave undesirable flexural modulus and heat sag. Epolene C-15 (Eastman Kodak Co.) is a polyethylene having a density of 0.906 g./cc. at 25° C., a melt index at 190° C. of 4200, a ring and ball softening point of 102° C. and a m.w. lower than Epolene C-10.

9 runs or compositions were each blended, cured and tested using 100 parts by weight 50/50 essentially non-crystalline EPDM Nordels 1660/1635, 70 Epolene C-10, 110 black 50/50 SRF-NS/FEF, 90 Suprex Clay, 15 Sunpar 2280 and the same amounts of the same curing agents with 5 parts cellulose fibers (long or short fibers, e.g., 18μ × 290μ and 18μ × 30μ) with and without resorcinol and hexamethylenetetramine. The fibers were difficult to disperse, and the resulting vulcanizates exhibited flexural moduli below 20,000 p.s.i. minimum. Repeating these runs wherein the cellulose fibers were increased to 45 phr raised the flexural modulus to above 20,000 p.s.i. but reduced the tensile strength to below 1500 p.s.i. minimum for the cured materials. Elimination of the cellulose fibers, resorcinol and hexamethylene tetramine gave a flexural modulus of only 15,250 p.s.i. for a cured product.

32 runs or compositions were each blended, cured and tested using 100 pbw 50/50 essentially non-crystalline Nordels 1660/1635, 90-170 phr 50:50 SRF-NS/FEF carbon blacks, 30-70 phr Epolene C-10, 0-40 phr DNPA 3130 branched polyethylene, 7.5-37.5 phr Sunpar 2280, 30-110 phr Suprex Clay, and the same types and amounts of curing agents as shown above. Of these 32 runs, only five exhibited flexural moduli over 20,000 p.s.i., and, of these, four had a compound Mooney of over 114 (ML1+4 at 250° F.) making the compounds difficult to process while the fifth had a Mooney of 97 (ML1+4 at 250° F.), which is somewhat high, and had a heat sag of 1.17 in. where the maximum generally used is 0.80 in. A composition without the DNPA 3130 had a flexural modulus of 14,430 p.s.i. and a heat sag of 0.77 in. On the other hand compositions with 20 phr DNPA 3130, everything else being constant, hand flexural moduli of 14,240 to 16,500 p.s.i. but heat sags of 0.91 to 1.31 in.

8 runs were made using compositions of 100 pbw "EPsyn" 4506 (random EPDM, ML 1+4 at 257° F. = 39, 64.5% ethylene, 3rd monomer — ethylidene norbornene, Copolymer Rubber & Chemical Corp.), 30-50 pbw crystalline polypropylene (CD-460, Exxon), 50-70 pbw 50/50 SRF-NS/FEF blacks, 20-40 pbw processing oil ("Tufflo" 6204, ARCO), 5 pbw zinc oxide, 1.5 zinc stearate, 1.5 pbw sulfur, 2 pbw Vocol S and 1 pbw of "Zenite" (zinc benzothiazylsulfide, du Pont). The components of the compositions were blended, cured and tested according to the above methods. Preliminary formulation efforts with these crystalline polypropylene-EPDM containing compositions led to the conclusion that the crystalline polypropylene increased processing viscosity (at common processing temperatures) to a prohibitive point. Moreover, when enough crystalline polypropylene was added to sufficiently increase hardness, Mooney compound viscosities approached 200 and went as high as 216 (ML1+4 at 212° F.).

4 runs were made using compositions of 100 pbw of "Vistalon" 2504 (random EPDM, Exxon Chem. Co., U.S.A., 62.8% ethylene, third monomer-ethylidene norbornene, ML1+8 at 212° F. − 40), 50-70 pbw 50/50 SRF-NS/FEF carbon blacks, 20-40 pbw processing oil (Tufflo 6204, ARCO), 5 pbw zinc oxide, 1.5-2.5 sulfur, 1-1.5 zinc stearate, 0-1 pbw Zenite, 2-2.5 pbw Vocol S, 0-1 pbw NOBS Special and 30-50 pbw of high density polyethylene (LS-630, MW>20,000, U.S. Industries). The components of these compositions were blended, cured and tested according to the foregoing methods. While the curing system regarding the general physicals obtained did not seem to be as effective as that used with the EPsyn 4506 EPDM (The runs immediately above), two runs gave flexural modulus of 20,000 and 29,000 p.s.i.; however, their compound Mooney viscosity ML1+4 at 212° F. was very high (164 and 162) which maybe considered as a prohibitive viscosity. The other two runs gave flexural modulus of 4,100 and 10,100 p.s.i. and compound Mooney viscosity ML1+4 at 212° F. of 60.5 and 72.

EXAMPLE 4

33 runs or compositions using crystalline EPDM and crystalline PE were blended in a Banbury and on a mill, cured and tested following the procedures of the foregoing examples. The overall components, their proportions and the overall results obtained for the runs are shown in the Table below:

TABLE 4

| COMPOSITION | |
|---|---|
| Components | Parts By Weight |
| Crystalline EPDM (Nordel 2722) | 60 to 100 |
| Non-crystalline EPDM (50:50 pbw mixture of Nordel 1635:Nordel 1660) | 40 to 0 |
| Crystalline PE (Epolene C-10) | 10 to 40 |
| Carbon black (50:50 pbw SRF-NS:FEF) | 65 to 125 |
| Clay (Suprex) | 60 to 90 |
| Processing oil (Sunpar 2280) | 7.5 to 27.5 |
| NOBS Special | 1.75 |
| Zinc oxide | 5.0 |
| Vocol S | 2.82 |
| Sulfur | 2.5 |
| Zinc stearate | 1.0 |

TABLE 4A

| RESULTS | | |
|---|---|---|
| Test | Range | Average |
| Mooney Scorch, low point, 275° F | 14 to 57 | 29.9 |
| Mooney Scorch at 275° F. min. to 5 pt. rise | 12 to 20.7 | 15.9 |
| Mooney Scorch at 275° F, min. to 10 pt. rise | 13.1 to 24.4 | 17.9 |
| Flexural Modulus, p.s.i., RT | 14,500 to 30,930 | 21,362 |
| Heat Sag, in. at 250° F. | .44 to 1.04 | .688 |
| Flexural set, degrees | 10 to 14 | 12 |
| Tear, p.l.i. (Die C) | 207 to 251 | 226 |
| 100% Modulus, p.s.i. | 946 to 1590 | 1318 |
| Tensile strength, p.s.i. | 1534 to 1871 | 1752 |
| Elongation, % | 124 to 337 | 228 |
| Compound Mooney Viscosity (ML1+4 at 100° C.) | 37.8 to 126 | 72.7 |

Of the above runs, 20 runs met all of the mechanical cured requirements for automobile fascia mentioned supra while on the average all 33 runs met these physical requirements for automobile fascia. While some of the Mooney compound viscosities of these runs were high, the compositions were still processable; in fact, only 4 compositions exhibited Mooney viscosities of over 100 ML1+4 at 100° C.

The embodiments of the invention in which an exclusive property or privilege is claimed are defined as follows:

1. A curable processable composition comprising a blend of an ethylene-propylene-diene rubbery polymer (EPDM) having a raw Mooney viscosity ML (1+4) at 250° F. of from about 25 to 100, a crystallinity at room temperature without stretching of from about 1.5 to 16%, and an ethylene content of at least about 65 mole %, and crystalline solid polyethylene (PE) having an average weight of from about 6,000 to 15,000, said crystalline polyethylene being used in an amount of from about 5 to 110 parts by weight per 100 parts by weight of said ethylene-propylene-diene polymer.

2. A curable processable composition according to claim 1 in which the parts by weight ratio of said PE to said EPDM is from about 10 to 100 to 40 to 100.

3. A curable processable composition according to claim 1 containing additionally finely divided rubber reinforcing pigments selected from the group consisting of carbon black pigments and non-carbon black pigments and mixtures of the same in an amount of from about 75 to 250 parts by weight per 100 parts by weight of the EPDM polymer, not over about 30% by weight of the composition being said carbon black pigment, a processing oil in an amount of not over about 75 parts by weight per 100 parts by weight of the EPDM polymer, and a sulfur curing system in an amount sufficient to cure said composition.

4. A curable processable composition according to claim 1 in which the EPDM contains at least 75 mole % ethylene, the PE is a low density polyethylene, and the diene is a non-conjugated diene.

5. A curable processable composition according to claim 4 containing additionally finely divided rubber reinforcing pigments selected from the group consisting of carbon black pigments and non-carbon black pigments and mixtures of the same in an amount of from about 75 to 250 parts by weight per 100 parts by weight of the EPDM polymer, not over about 30% by weight of the composition being said carbon black pigment, a processing oil in an amount of not over about 75 parts by weight per 100 parts by weight of the EPDM polymer and a sulfur curing system in an amount sufficient to cure said composition.

6. A curable processable composition according to claim 4 containing additionally finely divided rubber reinforcing pigments selected from the group consisting of carbon black pigments and non-carbon black pigments and mixtures of the same in an amount of from about 125 to 215 parts by weight per 100 parts by weight of the EPDM polymer, not over about 30% by weight of said composition being said carbon black pigment, a processing oil in an amount of from about 5 to 35 parts by weight per 100 parts by weight of the EPDM polymer and a sulfur curing system in an amount sufficient to cure said composition, and wherein the parts by weight ratio of said PE to said EPDM is from about 10:100 to 40:100.

7. A curable processable composition comprising a blend of an ethylene-propylene-diene rubbery polymer (EPDM) having a raw Mooney viscosity ML (1+4) at 250° F. of from about 25 to 35, a crystallinity at room temperature without stretching of from about 4.5 to 13%, and an ethylene content of at least about 65 mole %, and crystalline solid polyethylene (PE) having an average molecular weight of from about 6,000 to 15,000, said crystalline polyethylene being used in an amount of from about 5 to 110 parts by weight per 100 parts by weight of said ethylene-propylene-diene polymer.

8. A curable processable composition according to claim 7 in which the parts by weight ratio of said PE to said EPDM is from about 10 to 100 to 40 to 100.

9. A curable processable composition according to claim 7 containing additionally finely divided rubber reinforcing pigments selected from the group consisting of carbon black pigments and non-carbon black pigments and mixtures of the same in an amount of from about 75 to 250 parts by weight per 100 parts by weight of the EPDM polymer, not over about 30% by weight of the composition being said carbon black pigment, a processing oil in amount of not over about 75 parts by weight per 100 parts by weight of the EPDM polymer, and a sulfur curing system in an amount sufficient to cure said composition.

10. A curable processable composition according to claim 7 in which the EPDM contains at least 75 mole % ethylene, the PE is a low density polyethylene, and the diene is a non-conjugated diene.

11. A curable processable composition according to claim 10 containing additionally finely divided rubber reinforcing pigments selected from the group consisting of carbon black pigments and non-carbon black pigments and mixtures of the same in an amount of from about 75 to 250 parts by weight per 100 parts by weight of the EPDM polymer, not over about 30% by weight of the composition being said carbon black pigment, a processing oil in an amount of not over about 75 parts by weight per 100 parts by weight of the EPDM polymer and a sulfur curing system in an amount sufficient to cure said composition.

12. A curable processable composition according to claim 10 containing additionally finely divided rubber reinforcing pigments selected from the group consisting of carbon black pigments and non-carbon black pigments and mixtures of the same in an amount of from about 125 to 215 parts by weight per 100 parts by weight of the EPDM polymer, not over about 30% by weight of said composition being said carbon black pigment, a processing oil in an amount of from about 5 to 35 parts by weight per 100 parts by weight of the EPDM polymer and a sulfur curing system in an amount sufficient to cure said composition, and wherein the parts by weight ratio of said PE to said EPDM is from about 10:100 to 40:100.

13. A sulfur cured composition comprising a blend of an ethylene-propylene-diene rubbery polymer (EPDM) having a raw Mooney viscosity ML (1+4) at 250° F. of from about 25 to 100, a crystallinity at room temperature without stretching of from about 1.5 to 16%, and an ethylene content of at least about 65 mole %, and crystalline solid polyethylene (PE) having an average molecular weight of from about 6,000 to 15,000, said crystalline polyethylene being present in an amount of from about 5 to 110 parts by weight per 100 parts by weight of said ethylene-propylene-diene polymer.

14. A sulfur cured composition according to claim 13 in which the parts by weight ratio of said PE to said EPDM is from about 10 to 100 to 40 to 100.

15. A sulfur cured composition according to claim 13 containing additionally finely divided rubber reinforcing pigments selected from the group consisting of carbon black pigments and non-carbon black pigments and mixtures of the same in an amount of from about 75 to 250 parts by weight per 100 parts by weight of the EPDM polymer, not over about 30% by weight of the composition being said carbon black pigment, and a processing oil in an amount of not over about 75 parts by weight per 100 parts by weight of the EPDM polymer.

16. A sulfur cured composition according to claim 13 in which the EPDM contains at least 75 mole % ethylene, the PE is a low density polyethylene, and the diene is a non-conjugated diene.

17. A sulfur cured composition according to claim 16 containing additionally finely divided rubber reinforcing pigments selected from the group consisting of carbon black pigments and non-carbon black pigments and mixtures of the same in an amount of from about 75 to 250 parts by weight per 100 parts by weight of the EPDM polymer, not over about 30% by weight of the composition being said carbon black pigment, and a processing oil in an amount of not over about 75 parts by weight per 100 parts by weight of the EPDM polymer.

18. A sulfur cured composition according to claim 16 containing additionally finely divided rubber reinforcing pigments selected from the group consisting of carbon black pigments and non-carbon black pigments and mixtures of the same in an amount of from about 125 to 215 parts by weight per 100 parts by weight of the EPDM polymer, not over about 30% by weight of said composition being said carbon black pigment, and a processing oil in an amount of from about 5 to 35 parts by weight per 100 parts by weight of the EPDM polymer, and wherein the parts by weight ratio of said PE to said EPDM is from about 10:100 to 40:100.

19. A sulfur cured composition according to claim 18 exhibiting a flexural modulus at room temperature of about at least 20,000 p.s.i., a heat sag at 250° F. of not over about 0.80 inch, a flexural set in degrees of not over 20, a tear strength in pounds per linear inch (Die C) of at least 200, a 100% modulus of from 800 to 2,000 p.s.i., a tensile strength of at least 1,500 p.s.i., and an elongation of at least 150%.

20. A sulfur cured composition according to claim 13 in which up to about 40 parts by weight of said crystalline EPDM has been replaced by an essentially non-crystalline EPDM.

21. A sulfur cured composition comprising a blend of an ethylene-propylene-diene rubbery polymer (EPDM) having a raw Mooney viscosity ML (1+4) at 250° F. of from about 25 to 35 a crystallinity at room temperature without stretching of from about 4.5 to 13%, and an ethylene content of at least about 65 mole %, and crystalline solid polyethylene (PE) having an average molecular weight of from about 6,000 to 15,000, said crystalline polyethylene being present in an amount of from about 5 to 110 parts by weight per 100 parts by weight of said ethylene-propylene-diene polymer.

22. A sulfur cured composition according to claim 21 in which the parts by weight ratio of said PE to said EPDM is from about 10 to 100 40 to 100.

23. A sulfur cured composition according to claim 21 containing additionally finely divided rubber reinforcing pigments selected from the group consisting of carbon black pigments and non-carbon black pigments and mixtures of the same in an amount of from about 75 to 250 parts by weight per 100 parts by weight of the EPDM polymer, not over about 30% by weight of the composition being said carbon black pigment, and a processing oil in an amount of not over about 75 parts by weight per 100 parts by weight of the EPDM polymer.

24. A sulfur cured composition according to claim 21 in which the EPDM contains at least 75 mole % ethylene, the PE is a low density polyethylene, and the diene is a non-conjugated diene.

25. A sulfur cured composition according to claim 24 containing additionally finely divided rubber reinforcing pigments selected from the group consisting of carbon black pigments and non-carbon black pigments and mixtures of the same in an amount of from about 75 to 250 parts by weight per 100 parts by weight of the EPDM polymer, not over about 30% by weight of the composition being said carbon black pigment, and a processing oil in an amount of not over about 75 parts by weight per 100 parts by weight of the EPDM polymer.

26. A sulfur cured composition according to claim 24 containing additionally finely divided rubber reinforcing pigments selected from the group consisting of carbon black pigments and non-carbon black pigments and mixtures of the same in an amount of from about 125 to 215 parts by weight per 100 parts by weight of the EPDM polymer, not over about 30% by weight of said composition being said carbon black pigment, and a processing oil in an amount of from about 5 to 35 parts by weight per 100 parts by weight of the EPDM polymer, and wherein the parts by weight ratio of said PE to said EPDM is from about 10:100 to 40:100.

27. A sulfur cured composition according to claim 26 exhibiting a flexural modulus at room temperature of about at least 20,000 p.s.i., a heat sag at 250° F. of not over about 0.80 inch, a flexural set in degrees of not over 20, a tear strength in pounds per linear inch (Die C) of at least 200, a 100% modulus of from 800 to 2,000 p.s.i., a tensile strength of at least 1,500 p.s.i., and an elongation of at least 150%.

28. A sulfur cured composition according to claim 21 in which up to about 40 parts by weight of said crystalline EPDM has been replaced by an essentially non-crystalline EPDM.

* * * * *

UNITED STATES PATENT AND TRADEMARK OFFICE
CERTIFICATE OF CORRECTION

PATENT NO. : 4,128,523
DATED : December 5, 1978
INVENTOR(S) : James Earl Britton et al It is certified that error appears in the above-identified patent and that said Letters Patent are hereby corrected as shown below:

Column 13, line 14  "average weight" should read ---average molecular weight---

Column 16, line 5  "10 to 100  40 to 100" should read ---10 to 100 to 40 to 100---

Signed and Sealed this

*Twenty-seventh* Day of *March 1979*

[SEAL]

Attest:

RUTH C. MASON
*Attesting Officer*

DONALD W. BANNER
*Commissioner of Patents and Trademarks*